(12) United States Patent
Koyama et al.

(10) Patent No.: US 10,150,346 B2
(45) Date of Patent: Dec. 11, 2018

(54) VEHICLE

(71) Applicant: HONDA MOTOR CO., LTD., Tokyo (JP)

(72) Inventors: Rieko Koyama, Wako (JP); Kenta Sugitate, Wako (JP); Ryo Fujii, Wako (JP); Tetsuya Sugizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/460,233

(22) Filed: Mar. 16, 2017

(65) Prior Publication Data

US 2017/0267057 A1 Sep. 21, 2017

(30) Foreign Application Priority Data

Mar. 17, 2016 (JP) .................. 2016-053287

(51) Int. Cl.
*B60H 1/00* (2006.01)
*B60K 1/04* (2006.01)
*B60H 1/14* (2006.01)
*B60L 11/18* (2006.01)
*B62D 25/20* (2006.01)
(Continued)

(52) U.S. Cl.
CPC ..... *B60H 1/00278* (2013.01); *B60H 1/00564* (2013.01); *B60H 1/143* (2013.01); *B60H 1/246* (2013.01); *B60K 1/04* (2013.01); *B60L 11/1874* (2013.01); *B60L 11/1877* (2013.01); *B62D 25/20* (2013.01); *B62D 27/02* (2013.01); *B62D 27/065* (2013.01); *B60H 2001/003* (2013.01); *B60K 2001/005* (2013.01); *B60K 2001/0422* (2013.01); *B60Y 2306/05* (2013.01); *B60Y 2306/07* (2013.01)

(58) Field of Classification Search
CPC .................................................... B60R 16/04
See application file for complete search history.

(56) References Cited

U.S. PATENT DOCUMENTS 6,315,069 B1 * 11/2001 Suba .................. B60K 1/04
180/68.5
8,739,907 B2 * 6/2014 Storc .................. B60K 1/04
180/65.29
(Continued)

FOREIGN PATENT DOCUMENTS

| JP | 2004-345448 | 12/2004 |
| WO | WO 2007/105430 | 9/2007 |
| WO | WO 2013/030890 | 3/2013 |

OTHER PUBLICATIONS

Japanese Office Action for corresponding JP Application No. 2016-053287, dated Oct. 24, 2017 (w/ English machine translation).

*Primary Examiner* — James A Shriver, II
*Assistant Examiner* — Vaughn Coolman
(74) *Attorney, Agent, or Firm* — Mori & Ward, LLP

(57) ABSTRACT

A vehicle includes a floor panel, a battery module, a heater duct, and an exhaust duct. The battery module is disposed on the floor panel under a seat. The heater duct is disposed on the floor panel to discharge air output from an air conditioner through the heater duct. The exhaust duct is provided on the floor panel to discharge air output from the battery module through the exhaust duct. The exhaust duct intersects the heater duct viewed in a height direction of the vehicle.

11 Claims, 8 Drawing Sheets

(51) Int. Cl.
  *B60H 1/24* (2006.01)
  *B62D 27/02* (2006.01)
  *B62D 27/06* (2006.01)
  *B60K 1/00* (2006.01)

(56) References Cited

U.S. PATENT DOCUMENTS

| | | | |
|---|---|---|---|
| 9,343,785 B2 * | 5/2016 | Bito | H01M 10/6562 |
| 2010/0089675 A1 * | 4/2010 | Nagata | B60K 1/04 |
| | | | 180/68.5 |
| 2010/0231035 A1 * | 9/2010 | Tsuchiya | B60H 1/00278 |
| | | | 307/9.1 |
| 2014/0194049 A1 * | 7/2014 | Kumagai | B60K 1/04 |
| | | | 454/143 |
| 2017/0334309 A1 * | 11/2017 | Kouno | B60L 11/1874 |

* cited by examiner

VEHICLE

CROSS-REFERENCE TO RELATED APPLICATIONS

The present application claims priority under 35 U.S.C. § 119 to Japanese Patent Application No. 2016-053287, filed Mar. 17, 2016, entitled "Vehicle." The contents of this application are incorporated herein by reference in their entirety.

BACKGROUND

1. Field

The present disclosure relates to a vehicle.

2. Description of the Related Art

A battery module (a high-voltage battery) is disposed in a vehicle, such as a hybrid vehicle or an electric vehicle, that uses motor power to travel. For example, the Description of U.S. Patent Application Publication No. 2010/0231035, International Publication No. 2007/105430, and International Publication No. 2013/030890 disclose vehicles including a battery module disposed inside a vehicle interior, and exhaust ducts that exhaust air that has cooled the battery module. The exhaust ducts are disposed using a space under seats.

SUMMARY

According to one aspect of the present invention, a vehicle includes a floor panel, a battery module, an exhaust duct, and a heater duct. The battery module is disposed under a seat. The exhaust duct discharges air that has cooled the battery module. The heater duct is disposed above the floor panel. The heater duct discharges hot air from an air conditioner. The heater duct is provided so as to extend in a vehicle front-rear direction. The exhaust duct is provided so as to extend in a vehicle width direction and is disposed so as to intersect the heater duct.

According to another aspect of the present invention, a vehicle includes a floor panel, a battery module, a heater duct, and an exhaust duct. The battery module is disposed on the floor panel under a seat. The heater duct is disposed on the floor panel to discharge air output from an air conditioner through the heater duct. The exhaust duct is provided on the floor panel to discharge air output from the battery module through the exhaust duct. The exhaust duct intersects the heater duct viewed in a height direction of the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
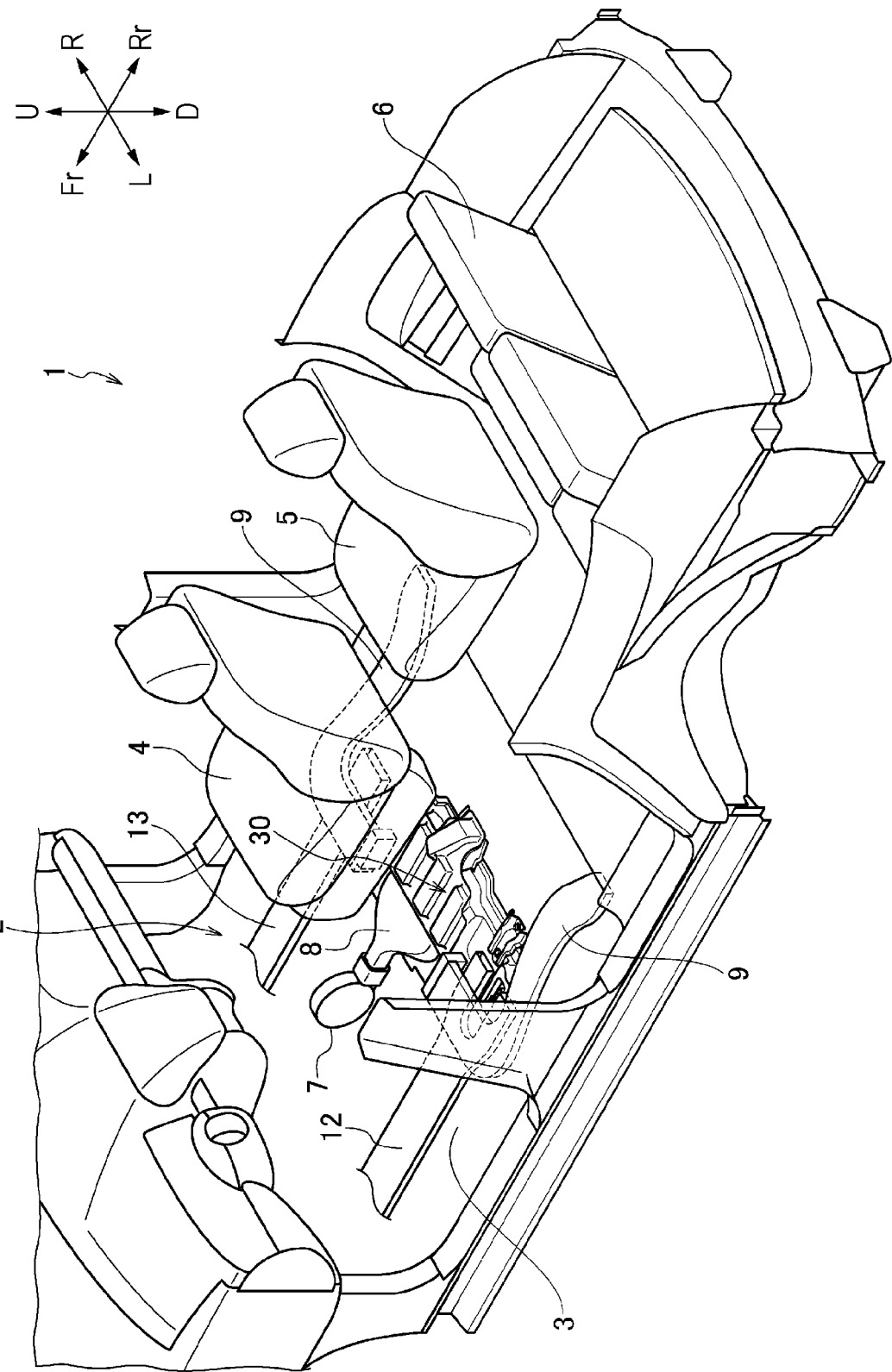
FIG. 1 is a perspective view illustrating an arrangement of main components of a vehicle interior of a vehicle according to an exemplary embodiment of the present disclosure and is a drawing in which a left front seat and a left rear seat are omitted.

The embodiments will now be described with reference to the accompanying drawings, wherein like reference numerals designate corresponding or identical elements throughout the various drawings.

Hereinafter, a vehicle of an exemplary embodiment of the present disclosure will be described with reference to the drawings. Note that the drawings are to be viewed while referring to the orientations of the signs, and in the following description, the directions such as the up and down, the left and right, and the forward and rear are based on the view of the driver. In the drawings, the front side of the vehicle is denoted as Fr, the rear side as Rr, the left side as L, the right side as R, the upper side as U, and the lower side as D.

As illustrated in FIG. 1, a vehicle 1 of the present exemplary embodiment includes, on a floor panel 3 that constitutes a floor portion of a vehicle interior 2, left and right front seats 4, left and right rear seats 5, foldable left and right third row seats 6, and a battery unit 30 that supplies electric power to a motor (not shown) and the like.

Figure 2:
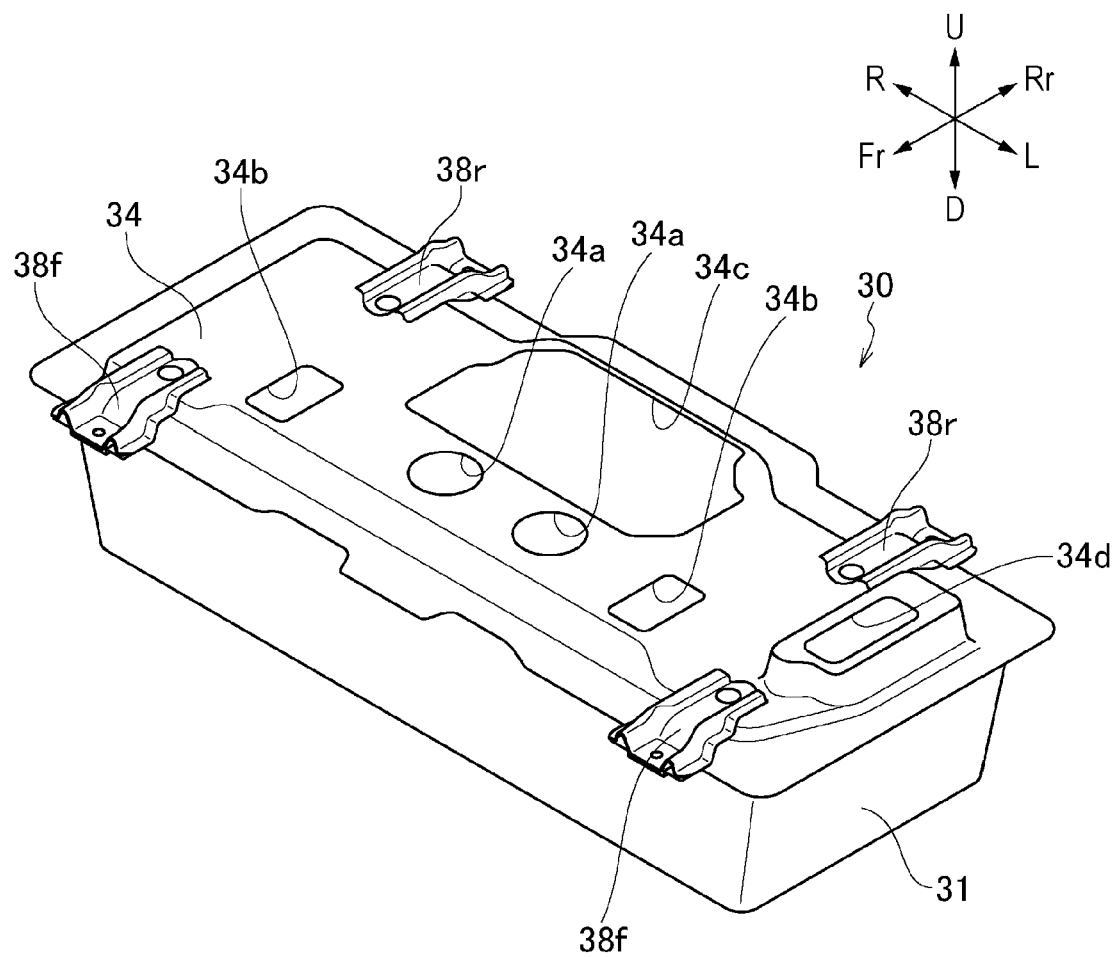
FIG. 2 is a perspective view of a battery unit according to the exemplary embodiment of the present disclosure.
Figure 3:
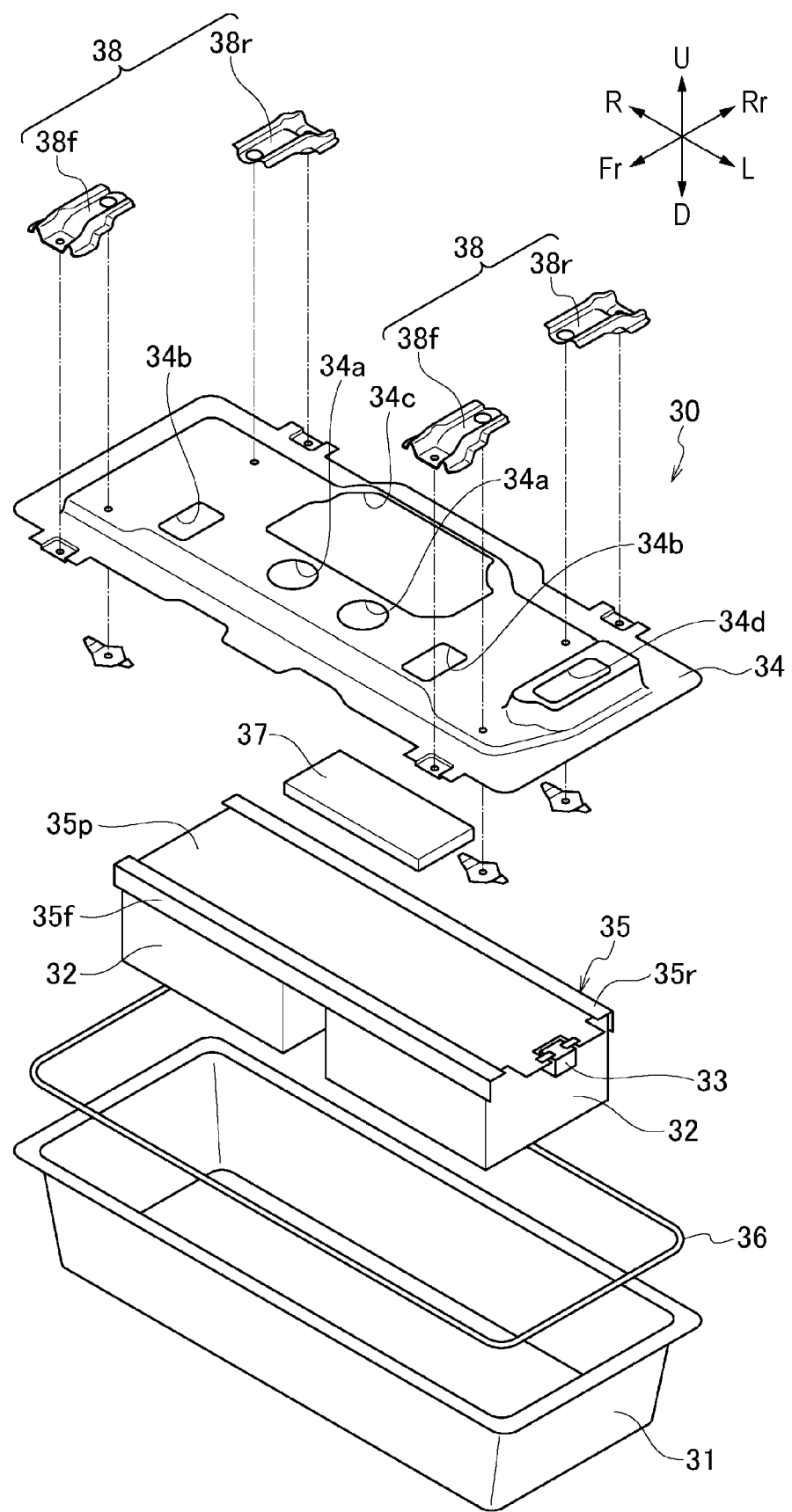
FIG. 3 is an exploded perspective view of the battery unit according to the exemplary embodiment of the present disclosure.
Figure 4:
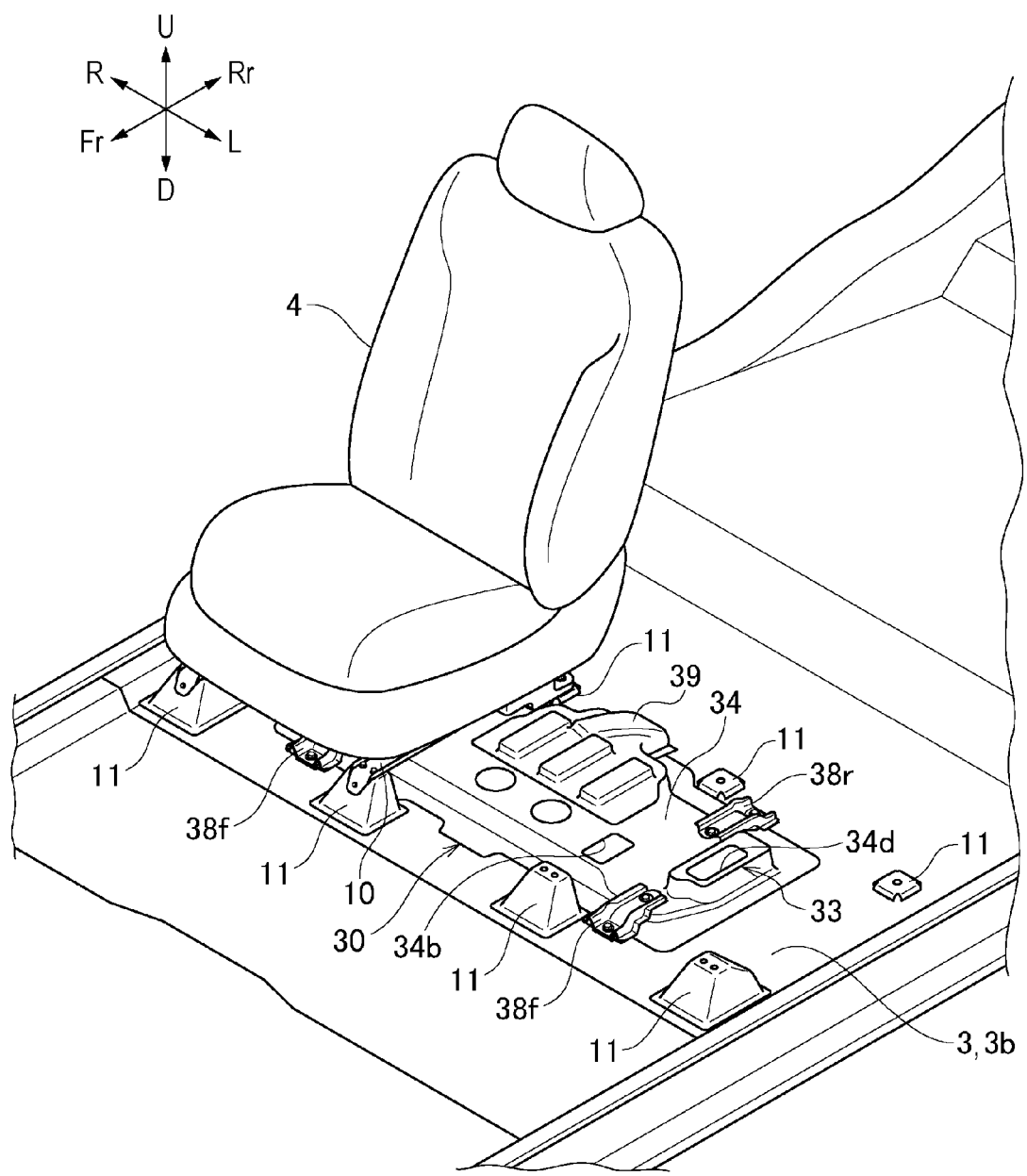
FIG. 4 is a perspective view illustrating a battery unit disposing portion of the vehicle according to the exemplary embodiment of the present disclosure viewed from the upper front side and is a drawing in which the left front seat is omitted.

As illustrated in FIGS. 2 and 3, the battery unit 30 includes a battery case 31 that has a rectangular parallelepiped shape that is long in the left-right direction in plan view, battery modules 32, a battery ECU 37, a battery cooling duct (not shown), and a maintenance and inspection plug 33 for maintenance and inspection that are accommodated in the battery case 31, and a battery cover 34 that covers an upper opening of the battery case 31.

The two battery modules 32 aligned left and right are accommodated in the battery unit 30 of the present exemplary embodiment, and the left and right battery modules 32 are connected to each other in an integrated manner by an upper frame member 35 that has a relatively high rigidity. The upper frame member 35 includes a pair of cross frames 35$f$ and 35$r$ that each have a substantially L-shaped cross section, and a rectangular upper panel 35$p$ that covers upper surfaces of the two battery modules 32. The cross frame 35$f$ is fixed to a front end portion of the upper panel 35$p$, and the cross frame 35$r$ is fixed to a rear end portion of the upper panel 35$p$, such that a partially closed cross section is formed. The battery modules 32 output electricity to a portion external to the battery unit 30 through the battery ECU 37 that controls the charging and discharging of the battery modules 32.

The battery cooling duct is configured such that air (cold air of an air conditioner, for example) introduced from a cooling fan 7 illustrated in FIG. 1 into the battery unit 30 through an introduction duct 8 cools the battery modules 32. The air after cooling is discharged into the vehicle interior 2 through exhaust ducts 9.

The battery cover 34 covers the upper opening of the battery case 31 in a hermetically sealed state while having a sealing member 36 in between. The battery cover 34 integrally includes left and right front fixing members 38f welded to the front end portion thereof and left and right rear fixing members 38r welded to the rear end portion thereof. The battery cover 34 is fixed to the floor panel 3 through the fixing members 38.

Two air introduction ports 34a to which the introduction duct 8 is connected, two air exhaust ports 34b to which the exhaust ducts 9 are connected, an ECU access port 34c for accessing the battery ECU 37 from a portion external to the battery unit 30, and a plug access port 34d for accessing the maintenance and inspection plug 33 from a portion external to the battery unit 30 are formed in the battery cover 34.

The ECU access port 34c and the plug access port 34d are normally covered by detachable access covers 39 and 40 (see FIG. 7), respectively. The ECU access port 34c or the plug access port 34d is opened by removing the access cover 39 or 40; accordingly, access to the battery ECU 37 or the maintenance and inspection plug 33 is enabled.

The maintenance and inspection plug 33 is an operation tool for blocking the output of electricity from the battery modules 32 when maintenance and inspection of the vehicle 1 is performed. The maintenance and inspection plug 33 is disposed inside the battery case 31 and on the left side in the vehicle width direction and is operated from the outside of the battery unit 30 through the plug access port 34d of the battery cover 34.

As illustrated in FIGS. 4 to 7, the battery unit 30 is disposed in a battery accommodating recess 3a (see FIG. 6) provided under the front seats 4 and in the floor panel 3 in a recessed manner. The battery unit 30 disposed in the battery accommodating recess 3a is fixed to the floor panel 3 by, as described above, being fastened to the floor panel 3 with the fixing members 38 provided in the battery cover 34.

Left and right seat rails 10 that movably support the front seat 4 in the vehicle front-rear direction and pairs of front and rear reinforcing portions 11 that support the front end portions and the rear end portions of the seat rails 10 are provided under each of the left and right front seats 4. The seat rails 10 and the reinforcing portions 11 have high rigidity so as to support the loads of the front seats 4 and the driver, and the reinforcing portions 11 are firmly fixed to the floor panel 3 by welding and the like. Furthermore, each seat rail 10 is held by being bridged across the corresponding front and rear reinforcing portions 11 provided so as to protrude upwards from a floor surface 3b of the floor panel 3.

Figure 5:
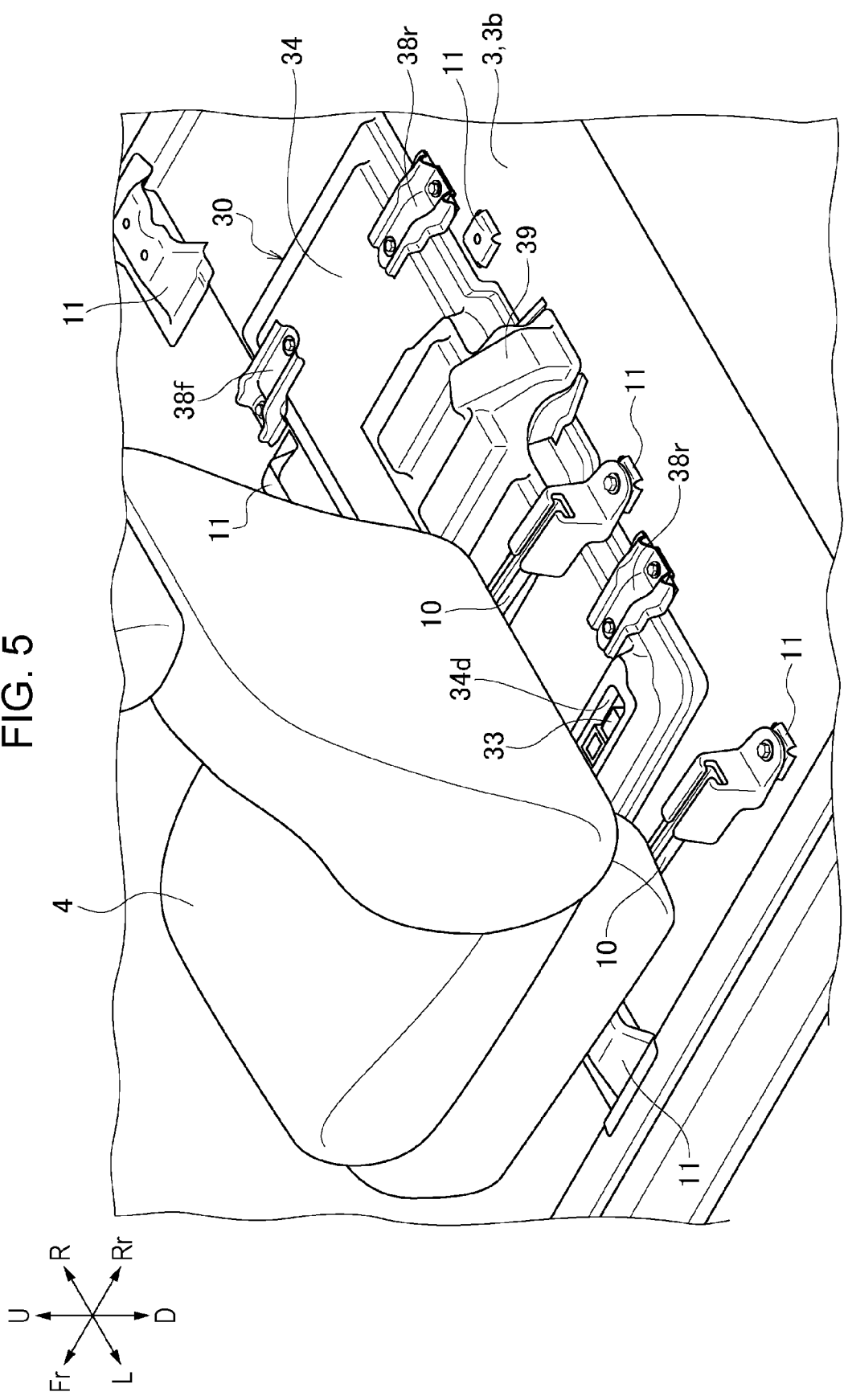
FIG. 5 is a perspective view illustrating the battery unit disposing portion of the vehicle according to the exemplary embodiment of the present disclosure viewed from the upper rear side and is a drawing in which a right front seat is omitted.

The position of the maintenance and inspection plug 33 in the front-rear direction is set so that the plug 33 can be accessed by moving the front seat 4 forward along the seat rails 10. In other words, while the maintenance and inspection plug 33 is hidden by the front seat 4 at normal times, when performing maintenance and inspection, as illustrated in FIG. 5, the maintenance and inspection plug 33 can be accessed by moving the front seat 4 forward.

Figure 7:
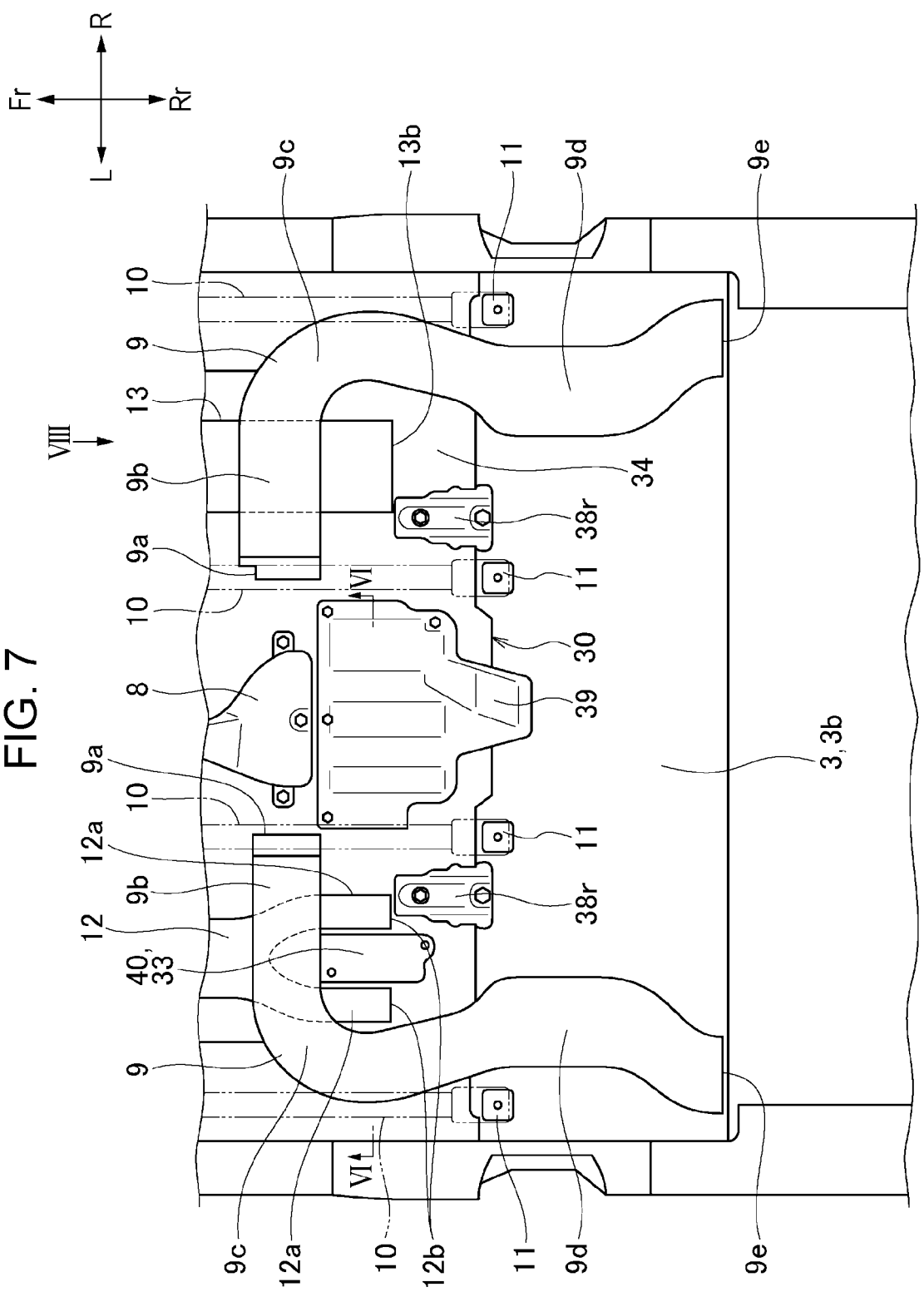
FIG. 7 is a plan view illustrating the battery unit disposing portion of the vehicle according to the exemplary embodiment of the present disclosure.

As illustrated in FIG. 7, a pair of left and right heater ducts 12 and 13 that extend in the vehicle front-rear direction are disposed under the left and right front seats 4 and above the battery cover 34 (or the floor panel 3). The left and right heater ducts 12 and 13 are disposed so as to extend above the floor panel and discharge hot air from the air conditioner that is connected to the front ends thereof towards the foot space of the rear seats 5 from discharge ports 12b and 13b at the rear ends thereof. Furthermore, the left and right heater ducts 12 and 13 each have a wide and flat shape so as to, while securing the needed cross-sectional areas of the flow paths, restrict the height dimension thereof.

Among the left and right heater ducts 12 and 13, the heater duct 12 on the left side includes left and right branch portions 12a that are branched to the left and right at the rear end side of the heater duct 12. The maintenance and inspection plug 33 is disposed so as to be positioned between the left and right branch portions 12a. With the above, the maintenance and inspection plug 33 can be accessed without dismounting the heater duct 12.

Figure 6:
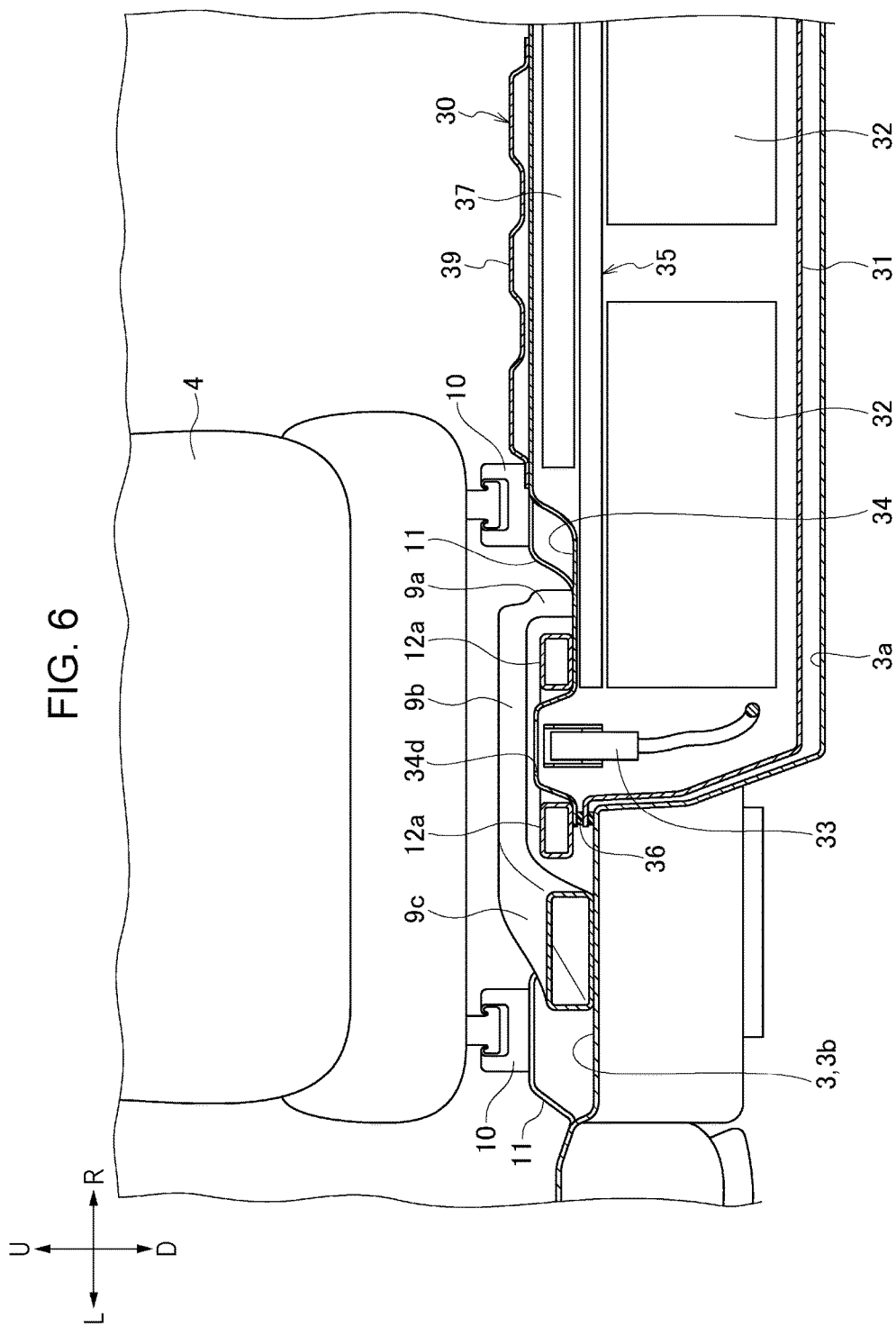
FIG. 6 is a cross-sectional view taken along line VI-VI in FIG. V.
Figure 8:
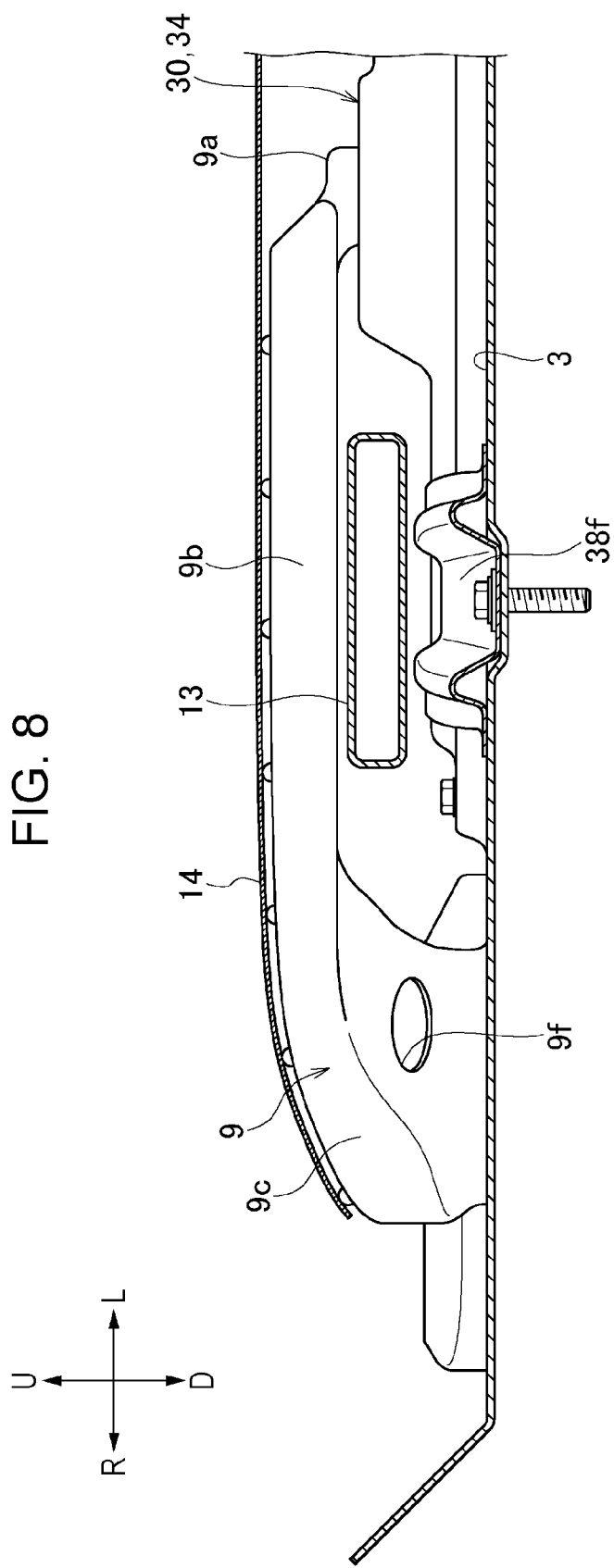
FIG. 8 is a front view of the battery unit disposing portion viewed from under the right front seat of the vehicle (from an arrow VIII in FIG. 7) according to the exemplary embodiment of the present disclosure.

As illustrated in FIGS. 6 to 8, the left and right exhaust ducts 9 are disposed so as to be substantially symmetrical to each other with respect to the center of the vehicle, and each have a wide and flat shape so as to, while securing the needed cross-sectional areas of the flow paths, restrict the height dimension thereof. Specific components of the exhaust ducts 9 include battery connecting portions 9a connected to the air exhaust ports 34b of the battery cover 34, vehicle width direction extension portions 9b provided so as to extend outwards from the battery connecting portions 9a in the vehicle width direction, bend portions 9c that extend from outer end portions of the vehicle width direction extension portions 9b and along the inside of the seat rails 10 of the front seats 4 on the outer side in the vehicle width direction and downwards towards the rear of the vehicle, front-rear direction extension portions 9d that extend from the bend portions 9c towards the rear of the vehicle in the vehicle front-rear direction, and exhaust ports 9e that are formed at the rear ends of the front-rear direction extension portions 9d and that discharge air at portions below the rear seats 5.

As illustrated in FIG. 6, the battery connecting portions 9a extend in a vertical direction from the air exhaust ports 34b of the battery cover 34 and, thus, the vehicle width direction extension portions 9b intersect the upper portions of the heater ducts 12 and 13 disposed so as to extend above the floor panel; accordingly, the exhaust ducts 9 and the heater ducts 12 and 13 are avoided from interfering with each other. Furthermore, since the exhaust ducts 9 and the heater ducts 12 and 13 each have a wide and flat shape so as to, while securing the needed cross-sectional areas of the flow paths, restrict the height dimension thereof, even when disposed to intersect each other, there will be no interference with portions on the underside of the front seats 4 and, furthermore, since the areas of the exhaust ducts 9 and the heater ducts 12 and 13 overlapping each other are larger in planar view, it is possible to transfer the exhaust heat of the battery modules 32 from the exhaust ducts 9 side to the heater ducts 12 and 13 side through heat exchange at the intersection portions.

The left and right exhaust ducts 9 also include exhaust ports 9f formed in the undersides of the bend portions 9c at positions near the intersection portions between the exhaust ducts 9 and the heater ducts 12 and 13. The air discharged from the exhaust ports 9f is exhausted inside the vehicle interior 2 in a dispersed manner through ventilation holes (not shown) formed in a carpet 14 covering the exhaust ducts 9 from above. Note that the positions in which the air is discharged from the exhaust ports 9e and the exhaust ports 9f are not limited to the above positions and may be changed to any other optional positions.

Furthermore, in intersecting the upper portion of the heater duct 12, the vehicle width direction extension portion 9b of the exhaust duct 9 on the left side that is among the left and right exhaust ducts 9 is disposed so as to pass the upper front side of the maintenance and inspection plug 33 (the plug access port 34d). With the above, the maintenance and inspection plug 33 can be accessed without dismounting the exhaust ducts 9.

As described above, in the vehicle 1 of the present exemplary embodiment, since the exhaust ducts 9 are provided so as to extend in the vehicle width direction and are disposed so as to intersect the heater ducts 12 and 13, the exhaust ducts 9 can be disposed using the space below the front seats 4 while avoiding interference with the heater ducts 12 and 13.

Furthermore, since the battery modules 32 are disposed under the front seats 4 and in the battery accommodating recess 3a provided in the floor panel 3 in a recessed manner, not only a large space can be secured inside the vehicle interior but the front seats 4 can be disposed at low positions.

Furthermore, since the battery connecting portions 9a of the exhaust ducts 9 extend in the vertical direction from the air exhaust ports 34b of the battery cover 34, the exhaust ducts 9 can intersect the upper portions of the heater ducts 12 and 13 disposed so as to extend above the floor panel 3 and can avoid interfering with the heater ducts 12 and 13.

Furthermore, since the exhaust ducts 9 intersect the upper portions of the heater ducts 12 and 13, the intersection portions are distanced away from the floor panel 3. In the exhaust ducts 9, since the exhaust ports 9f are provided near the intersection portions and in the undersides of the bend portions 9c that oppose the floor panel 3, the exhaust ducts 9 can exhaust air into a relatively large space between the floor panel 3 and the carpet 14, and the exhaust air flow and the exhaust air temperature can be reduced.

Furthermore, since the heater duct 12 is branched so that the maintenance and inspection plug 33 is positioned between the branched heater duct 12 in the vehicle width direction, the maintenance and inspection plug 33 can be accessed without dismounting the heater duct 12.

Note that the present disclosure is not limited to the exemplary embodiment described above, and change in shape, modifications, and the like may be performed appropriately.

For example, the exhaust ducts 9 may include battery connecting portions 9a connected to the air exhaust ports 34b of the battery cover 34, and vehicle width direction extension portions 9b that extend from the battery connecting portions 9a towards the outside in the vehicle width direction such that air is exhausted under the front seats 4 towards the left and right.

Furthermore, in the exemplary embodiment described above, the exhaust ducts 9 and the heater ducts 12 and 13 are substantially orthogonal to each other; however, not limited to the above case, it is only sufficient that the exhaust ducts 9 and the heater ducts 12 and 13 intersect each other.

A vehicle (a vehicle of an exemplary embodiment described later, for example) according to a first aspect of the exemplary embodiment includes a floor panel (a floor panel of the exemplary embodiment described later, for example), a battery module (a battery module of the exemplary embodiment described later, for example) disposed under a seat (a front seat of the exemplary embodiment described later, for example), an exhaust duct (an exhaust duct of the exemplary embodiment described later, for example) that discharges air that has cooled the battery module, and a heater duct (heater duct of the exemplary embodiment described later, for example) disposed above the floor panel, the heater duct discharging hot air from an air conditioner, in which the heater duct is provided so as to extend in a vehicle front-rear direction, and in which the exhaust duct is provided so as to extend in a vehicle width direction and is disposed so as to intersect the heater duct.

According to the first aspect of the exemplary embodiment, since the exhaust duct is provided so as to extend in the vehicle width direction and is disposed so as to intersect the heater duct, the exhaust duct can be disposed using a space below the front seat while avoiding interference with the heater duct.

A vehicle according to a second aspect of the exemplary embodiment may be the vehicle according to the first aspect in which the battery module includes a maintenance and inspection plug (a maintenance and inspection plug of the exemplary embodiment described later, for example) that blocks electricity output from the battery module, and in which the heater duct is branched such that the maintenance and inspection plug is positioned therebetween in the vehicle width direction.

According to the second aspect of the exemplary embodiment, since the heater duct is branched such that the maintenance and inspection plug is positioned therebetween in the vehicle width direction, the maintenance and inspection plug can be accessed without dismounting the heater duct. Furthermore, the maintenance and inspection plug can be protected by the heater duct.

A vehicle according to a third aspect of the exemplary embodiment may be the vehicle according to the first aspect in which the battery module is disposed in a battery accommodating recess (a battery accommodating recess of the exemplary embodiment described later, for example), the battery accommodating recess being provided in the floor panel in a recessed manner, in which the exhaust duct includes a battery connecting portion (a battery connecting portion of the exemplary embodiment described later, for example) that extends in a vertical direction from a connection portion (an air exhaust port of the exemplary embodiment described later, for example) of the battery module, and a vehicle width direction extension portion (a vehicle width direction extension portion of the exemplary embodiment described later, for example) that extends in the vehicle width direction from the battery connecting portion, and in which in the exhaust duct, the vehicle width direction extension portion intersects an upper portion of the heater duct.

According to the third aspect of the exemplary embodiment, since the battery module is disposed in the battery accommodating recess provided in the floor panel in a recessed manner, not only a large space can be secured inside the vehicle interior but the seat can be disposed at a low position. Furthermore, since the battery connecting portion of the exhaust duct extends in the vertical direction from the connection portion of the battery module, the exhaust duct can intersect the upper portion of the heater duct disposed above the floor panel and can avoid interfering with the heater duct.

A vehicle according to a fourth aspect of the exemplary embodiment may be the vehicle according to the third aspect in which an exhaust port (an exhaust port of the exemplary embodiment described later, for example) is provided in the exhaust duct near a portion where the vehicle width direction extension portion intersects the upper portion of the heater duct, and in an underside of the exhaust duct.

According to the fourth aspect of the exemplary embodiment, in the exhaust duct, since an exhaust port is provided near a portion where the vehicle width direction extension portion intersects the upper portion of the heater duct, the portion being distanced away above the floor panel, and in an underside of the exhaust duct that opposes the floor panel, air can be exhausted to a relatively large space between the floor panel and a carpet, and the exhaust air flow and the exhaust air temperature can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
a floor panel;
a battery module disposed under a seat;
an exhaust duct that discharges air that has cooled the battery module; and
a heater duct disposed above the floor panel, the heater duct discharging hot air from an air conditioner,
wherein the heater duct is provided so as to extend in a vehicle front-rear direction,
wherein the exhaust duct is provided so as to extend in a vehicle width direction and is disposed so as to intersect the heater duct,
wherein the battery module includes a maintenance and inspection plug that blocks electricity output from the battery module, and
wherein the heater duct is branched such that the maintenance and inspection plug is positioned therebetween in the vehicle width direction.

2. The vehicle according to claim 1,
wherein the battery module is disposed in a battery accommodating recess, the battery accommodating recess being provided in the floor panel in a recessed manner,
wherein the exhaust duct includes a battery connecting portion that extends in a vertical direction from a connection portion of the battery module, and a vehicle width direction extension portion that extends in the vehicle width direction from the battery connecting portion, and
wherein in the exhaust duct, the vehicle width direction extension portion intersects an upper portion of the heater duct.

3. The vehicle according to claim 2,
wherein an exhaust port is provided in the exhaust duct near a portion where the vehicle width direction extension portion intersects the upper portion of the heater duct, and in an underside of the exhaust duct.

4. A vehicle comprising:
a floor panel;
a battery module disposed on the floor panel under a seat;
a heater duct disposed on the floor panel to discharge air output from an air conditioner through the heater duct; and
an exhaust duct provided on the floor panel to discharge air output from the battery module through the exhaust duct, the exhaust duct intersecting the heater duct viewed in a height direction of the vehicle,
wherein the battery module includes a maintenance and inspection plug that blocks electricity output from the battery module, and
wherein the heater duct is branched such that the maintenance and inspection plug is positioned therebetween in a width direction of the vehicle.

5. The vehicle according to claim 4, wherein
the heater duct extends in a front-rear direction of the vehicle substantially perpendicular to the height direction,
the exhaust duct includes a vehicle width direction extension duct in a width direction of the vehicle substantially perpendicular to the front-rear direction and the height direction, and
the vehicle width direction extension intersects the heater duct viewed in the height direction.

6. The vehicle according to claim 5, wherein
the heater duct is provided between a bottom of the seat and the floor panel in the height direction, and
the vehicle width direction extension is provided between the bottom of the seat and the heater duct in the height direction.

7. The vehicle according to claim 4,
wherein the battery module is disposed in a battery accommodating recess, the battery accommodating recess being provided in the floor panel in a recessed manner,
wherein the exhaust duct includes a battery connecting portion that extends in the height direction from a connection portion of the battery module, and a vehicle width direction extension portion that extends in a width direction of the vehicle from the battery connecting portion, and
wherein in the exhaust duct, the vehicle width direction extension portion intersects an upper portion of the heater duct.

8. The vehicle according to claim 7,
wherein an exhaust port is provided in the exhaust duct near a portion where the vehicle width direction extension portion intersects the upper portion of the heater duct, and in an underside of the exhaust duct.

9. A vehicle comprising:
a floor panel;
a battery module disposed on the floor panel under a seat;
a heater duct disposed on the floor panel to discharge air output from an air conditioner through the heater duct; and
an exhaust duct provided on the floor panel to discharge air output from the battery module through the exhaust duct, the exhaust duct intersecting the heater duct viewed in a height direction of the vehicle,
wherein the exhaust duct extends between a bottom of the seat and the heater duct in the height direction.

10. The vehicle according to claim 9, wherein
the heater duct extends in a front-rear direction of the vehicle substantially perpendicular to the height direction,
the exhaust duct includes a vehicle width direction extension duct in a width direction of the vehicle substantially perpendicular to the front-rear direction and the height direction, and
the vehicle width direction extension intersects the heater duct viewed in the height direction.

11. The vehicle according to claim 10, wherein
the heater duct is provided between the bottom of the seat and the floor panel in the height direction, and
the vehicle width direction extension is provided between the bottom of the seat and the heater duct in the height direction.

* * * * *